(12) United States Patent
Shankar et al.

(10) Patent No.: US 10,715,851 B1
(45) Date of Patent: Jul. 14, 2020

(54) DIGITAL RIGHTS MANAGED VIRTUAL REALITY CONTENT SHARING

(71) Applicant: BigScreen, Inc., Walnut, CA (US)

(72) Inventors: Darshan Shankar, San Francisco, CA (US); David Petrie, Wellington (NZ)

(73) Assignee: BigScreen, Inc., Walnut, CA (US)

( * ) Notice: Subject to any disclaimer, the term of this patent is extended or adjusted under 35 U.S.C. 154(b) by 0 days.

(21) Appl. No.: 16/716,240

(22) Filed: Dec. 16, 2019

(51) Int. Cl.
| | |
|---|---|
| G06F 21/32 | (2013.01) |
| G06F 21/34 | (2013.01) |
| G06F 21/36 | (2013.01) |
| G06F 3/13 | (2006.01) |
| H04N 21/2347 | (2011.01) |
| H04N 21/254 | (2011.01) |
| H04N 21/2387 | (2011.01) |
| H04N 21/4405 | (2011.01) |
| G06T 19/00 | (2011.01) |
| H04N 21/472 | (2011.01) |
| H04N 21/81 | (2011.01) |
| G06T 1/20 | (2006.01) |
| G06F 3/01 | (2006.01) |
| H04N 21/4627 | (2011.01) |

(52) U.S. Cl.
CPC ......... H04N 21/2541 (2013.01); G06F 3/013 (2013.01); G06T 1/20 (2013.01); G06T 19/006 (2013.01); H04N 21/2347 (2013.01); H04N 21/2387 (2013.01); H04N 21/4405 (2013.01); H04N 21/4627 (2013.01); H04N 21/47217 (2013.01); H04N 21/8146 (2013.01)

(58) Field of Classification Search
CPC .......... G06F 21/32; G06F 21/34; G06F 21/36; G06F 3/13
See application file for complete search history.

(56) References Cited

U.S. PATENT DOCUMENTS

| | | | |
|---|---|---|---|
| 9,985,786 B1 * | 5/2018 | Bhabbur | G09C 5/00 |
| 10,432,687 B1 * | 10/2019 | Hanes | H04L 65/80 |
| 10,540,491 B1 * | 1/2020 | Martinez | G06F 21/36 |
| 2016/0072774 A1 * | 3/2016 | McRae | H04L 63/0428 |
| | | | 713/168 |
| 2016/0285870 A1 * | 9/2016 | Poornachandran | G06F 1/3287 |
| 2016/0350549 A1 * | 12/2016 | Hampel | H04L 63/08 |
| 2017/0317996 A1 * | 11/2017 | Poornachandran | H04L 63/061 |
| 2018/0069760 A1 * | 3/2018 | Zhang | H04L 67/2847 |
| 2018/0173856 A1 * | 6/2018 | Ahmed | G06F 21/10 |
| 2018/0212766 A1 * | 7/2018 | Greenspan | H04L 9/0822 |

(Continued)

Primary Examiner — Mushfikh I Alam
(74) Attorney, Agent, or Firm — Cognition IP, P.C.; Bryant Lee

(57) ABSTRACT

Methods and systems describe providing digitally rights managed audiovisual content in a virtual reality (VR) viewing experience. Audiovisual content may be requested from a content delivery network upon determining that a user of a VR device is associated with an unexpired ticket to access the audiovisual content. The content delivery network generates a playback manifest, which is used by a digital rights management subsystem of the VR device to locate and download the content. A decrypted version of the audiovisual content plays within a graphical processor unit memory, such that the content is displayed on a virtual screen for the user within a VR viewing experience without the application or third party applications having access to the audiovisual content.

18 Claims, 8 Drawing Sheets

(56) References Cited

U.S. PATENT DOCUMENTS

| | | | |
|---|---|---|---|
| 2018/0232048 A1* | 8/2018 | Popovich | A61B 3/113 |
| 2018/0316948 A1* | 11/2018 | Todd | H04N 21/2365 |
| 2018/0349946 A1* | 12/2018 | Nguyen | G06T 11/60 |
| 2019/0042778 A1* | 2/2019 | Sukhomlinov | G06F 21/6218 |
| 2019/0108578 A1* | 4/2019 | Spivack | G06F 3/013 |
| 2019/0236416 A1* | 8/2019 | Wang | G06F 3/017 |
| 2019/0246149 A1* | 8/2019 | Reza | H04N 21/23476 |
| 2019/0362056 A1* | 11/2019 | Shimakawa | G06F 21/105 |
| 2020/0014988 A1* | 1/2020 | Navali | H04N 21/23439 |
| 2020/0023157 A1* | 1/2020 | Lewis | H04N 5/23238 |
| 2020/0064913 A1* | 2/2020 | He | G06K 9/0061 |
| 2020/0077161 A1* | 3/2020 | Lohmar | H04L 65/4076 |
| 2020/0089319 A1* | 3/2020 | Popovich | G02B 27/0093 |

\* cited by examiner

DIGITAL RIGHTS MANAGED VIRTUAL REALITY CONTENT SHARING

FIELD OF THE INVENTION

The present invention relates generally to digital content, and more particularly, to methods and apparatuses for providing digital rights managed audiovisual content in a virtual reality viewing experience.

BACKGROUND

Within the field of media, the popularity of immersive virtual reality, augmented reality, and mixed reality (collectively referred to hereinafter as "VR") experiences is increasing. In recent years, the number of consumers with access to VR has exploded as affordably priced, consumer-targeted options have appeared in the global marketplace. One desirable avenue for VR is the creation of VR experiences directed to allowing users to engage with media content in a new and immersive way. For example, it is possible for users to watch or engage with audiovisual content, such as movies or video games, which appear as though projected on a massive theater screen inside of the virtual reality environment. To the user, it may appear convincing that the user is "inside" a movie theater—the virtual screen may be so big that the user will have to turn or tilt her head to catch a detail at the edge of the screen, for example.

While such experiences have been established and possible for consumers for years, challenges remain in providing the audiovisual content in a protected, digitally rights managed fashion. For example, with the theater-like possibilities of VR viewing experiences, it would be beneficial to offer premium, recently released films a user would normally have to go to a physical movie theater to experience. However, with such premium content in particular, it becomes crucial to avoid piracy and capturing of the audiovisual content for others to view. Even the possibility of a user taking off a VR headset to let another user watch the movie being displayed on the virtual screen presents possibilities for dissemination of the content outside of paying customers of the content.

Thus, there is a need in the field of digital content to create a new and useful system and method for providing digitally rights managed audiovisual content in a VR viewing experience. The source of the problem, as discovered by the inventors, is a lack of protected, trusted mechanisms for displaying audiovisual content without an application or VR device storing or being able to access the audiovisual content.

SUMMARY OF THE INVENTION

One embodiment relates to providing digital rights managed audiovisual content in a VR viewing experience, based on receiving a request to access audiovisual content from an application associated with a VR device in use by a user. The embodiment may then determine that the user is connected to an unexpired ticket for the user to access the audiovisual content. The embodiment may send a content request to a content delivery network ("CDN") storing an encrypted copy of the audiovisual content. The embodiment may receive a playback manifest from the CDN, and then send the playback manifest to a digital rights management (DRM) subsystem of the VR device. The embodiment may then receive notification from the DRM subsystem that the encrypted audiovisual content has been downloaded from the CDN and decrypted within a graphical processor unit (GPU) memory of the VR device. The embodiment may then provide the decrypted audiovisual content for playback on the VR device from within the protected GPU memory of the VR device.

Another embodiment relates to using eye tracking aspects of a VR device to provide digital rights managed audiovisual content within a VR viewing experience, based on receiving a request to access audiovisual content from an application associated with a VR device in use by a user. The embodiment may then determine that the user is connected to an unexpired ticket for the user to access the audiovisual content. The embodiment may then receive a visual representation of an eye of the user, and check for a match of the visual representation of the eye of the user with a preexisting unique eye signature associated with one of the unexpired tickets. If a match cannot be found, the embodiment may deny access to or stop playback of the audiovisual content as applicable. If a match is found, the embodiment may proceed with sending a content request to a CDN storing an encrypted copy of the audiovisual content. Some embodiments may periodically execute a new search for a match of the eye signature, including during playback of the audiovisual content.

Additional features and advantages will be set forth in the description which follows, and in part will be implicit from the description, or may be learned by the practice of the embodiments.

DETAILED DESCRIPTION

Figure 1A:
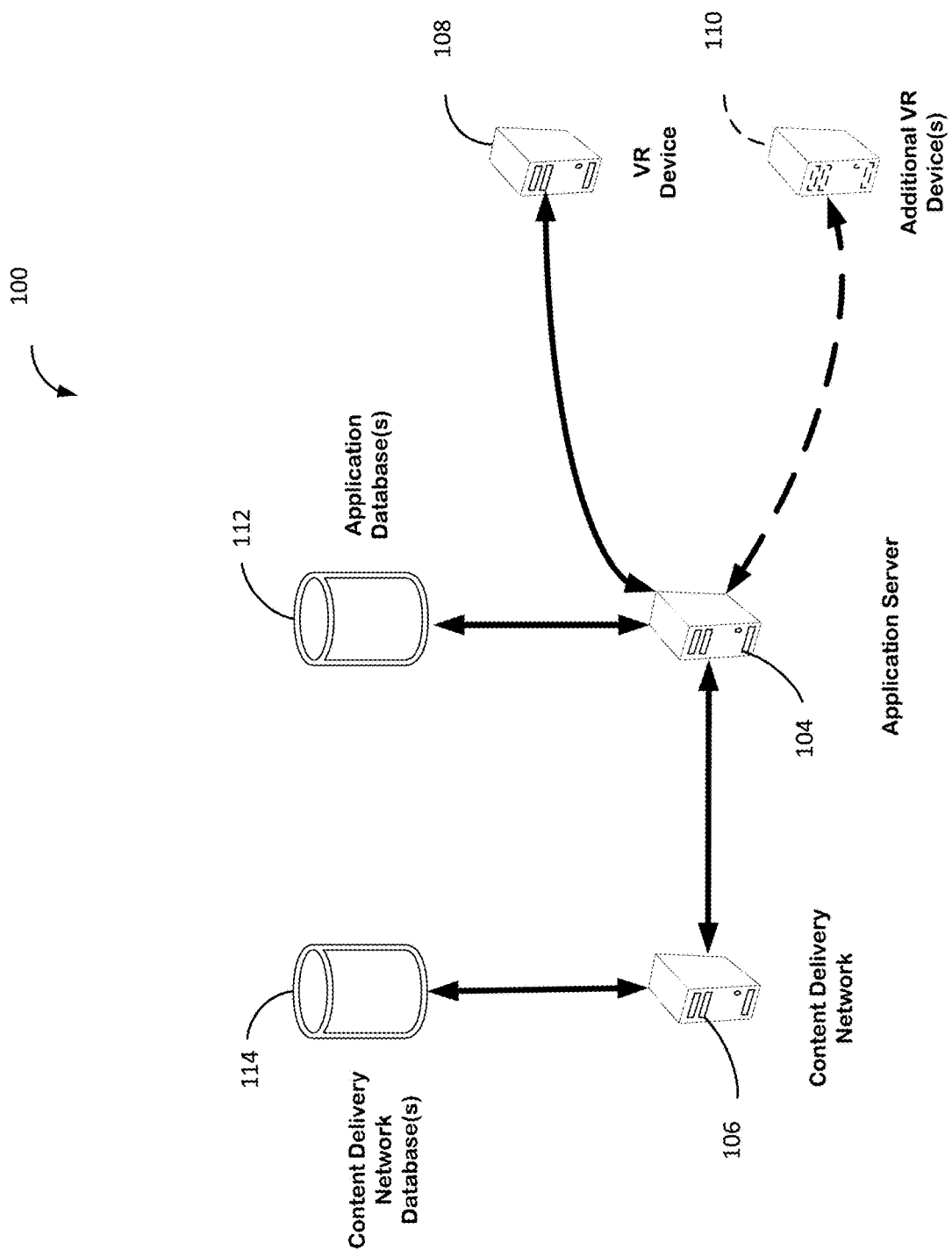
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments relate to providing a VR viewing experience via a VR device. "VR" shall be understood to contemplate, e.g., virtual reality, augmented reality, mixed reality, and/or any other suitable VR, VR-related or VR-adjacent experience. A "VR device" as used herein can facilitate virtual reality, augmented reality, mixed reality, and/or any other suitable VR, VR-related, or VR-adjacent viewing experience.

A VR viewing experience refers to access, viewing, and/or playback of content within a VR-enabled environment. In some embodiments, the content refers to audiovisual content. Audiovisual content may include, e.g., purely audio content, purely visual content, audio and visual content synced together, film, television, broadcasted or streamed live events or live video, music tracks, podcast material, social media content, interactive content, video game content, applications, live or archived sporting events, political events, news broadcasts, screensharing, advertisements, and/or some combination thereof, and/or any other combination of suitable media for viewing and/or listening.

Storage or retrieval refers to storing a file in or retrieving a file from computer storage or computer memory, examples of which include databases, file systems, disks, non-volatile memory, removable media such as CD-Rs and DVD-Rs, and other media. The storage or memory may exist inside the local computer operated by the computer, but it could also exist on storage or memory external to the local computer. For example, a file may be stored in storage or memory located across a bus or network. Furthermore, the file could be stored in storage or memory that is connected to a remote server. Similarly, the file could be stored in a storage or memory unit in a distributed computing or cloud computing environment.

I. Exemplary Environments

FIG. 1A illustrates an exemplary environment in which some embodiments may operate. In the exemplary environment 100, a VR device 108 and one or more optional additional VR device(s) 110 are connected over a network to an application server 104, which is connected to one or more application database(s) 112. The application server 104 is connected to and communicable with content delivery network ("CDN") 106, which is connected to one or more content delivery network database(s) 114. VR devices and servers in this environment may be computers. Application server 104 may be configured to handle requests from VR devices. Application server 104 may be implemented as a number of networked server devices, though it is illustrated as a single entity.

The exemplary environment 100 is illustrated with only one application server and one content delivery network for simplicity, though in practice there may be more or fewer application servers and content delivery networks. The computers have been termed VR devices and servers, though VR devices can also play the role of servers and servers can also play the role of VR devices. In some embodiments, the VR device 108 and optional additional VR device(s) 110 may communicate with each other as well as the application servers. Also, the application server 104 may communicate with other servers.

The network(s) facilitating the application server and/or content delivery network communications in exemplary embodiment 100 may be, for example, local area networks (LANs), wide area networks (WANs), telephone networks, wireless networks, intranets, the Internet, or combinations of networks. The application server 104 may be connected to application database(s) 112 over a connection medium, which may be a bus, crossbar, network, or other interconnect. Application database(s) 112 and content delivery network database(s) 114 may be implemented as a network of multiple storage devices, though they are illustrated as single entities. Application database(s) 112 and content network database(s) 114 may be file systems, disks, databases, or other units capable of storage.

In an embodiment, the VR device 108 may perform the method 200 or other method herein and, as a result, download or retrieve a file for playback from application database(s) 112 or content delivery network database(s) 114. This may be accomplished via communication over the network between the VR device 108 and application server 104, and/or communication over the network or some other network between the application server 104 and content delivery network 106. For example, the VR device 108 may communicate a request to the application server 104 to access audiovisual content with a specified name or attached license in the application database(s) 112. The application server 104 may respond to the request and store the file with the specified name or attached license in the application database(s) 112.

Application server 104 functions to receive requests to access audiovisual content, determine that users are connected to unexpired tickets for accessing the audiovisual content, sending content requests to the CDN, receiving and sending playback manifests generated by the CDN, and providing decrypted audiovisual content to be played on the VR device 108 and/or additional VR device(s) 110. Application server 104 contains one or more components which can perform tasks related to user authorization to access audiovisual content. In some embodiments, the application server 104 is a computing device or series of networked computing devices capable of digital rights management and content authorization and distribution tasks. In some embodiments, the application server 104 is located remotely from the VR device 108 and/or additional VR device(s) 110. In varying embodiments, the application server 104 is communicatively coupled with, and capable of sending and/or receiving information from one or more databases (e.g., application database(s) 112 and/or content delivery network database(s) 114), content delivery network 106, VR device 108, and/or additional VR devices 110. In some embodiments, application server 104 includes an identity management module configured to determine whether the identity of a user matches license and/or ticket information for authorizing access to specific audiovisual content.

Content delivery network 106 functions to ingest, store, maintain, package, and/or deliver audiovisual content. In some embodiments, the CDN 106 hosts audiovisual content, and packages audiovisual content with digital rights management data, the appropriate licenses, the appropriate metadata, and/or any other suitable data. The CDN 106 also generates playback manifests which can be used within the system 100 as part of the authorization and information required for users to access the audiovisual files. In some embodiments, content delivery network 106 functions to manage encryption keys, including public and/or private keys for encrypting and decrypting audiovisual content.

VR device 108 is a device that sends information to the application server 104, receives information from the application server 104, or both. In some embodiments, VR device 108 is a computing device capable of providing or facilitating a VR (e.g., virtual reality, augmented reality, mixed reality, or any other suitable VR, VR-related, or VR-adjacent) experience. In some embodiments, VR device 108 is capable of hosting and executing an application which provides a VR viewing experience for a user accessing the VR device. In some embodiments, VR device 108 is capable of communicating and interacting with one or more optional additional VR device(s) 110 via the application server and via the application facilitating a shared VR viewing experience with one or more additional users accessing the one or more additional VR devices. In some embodiments, VR device 108 includes a digital rights management (DRM) subsystem configured to execute one or more DRM protocols. Examples of DRM protocols may include, e.g., PlayReady and Widevine standard DRM protocols. In some embodiments, VR device 108 includes a protected graphical processor unit (GPU) memory with restrictions for viewing, accessing, and/or modifying content stored therein. In some embodiments, the VR device 108 includes a protected display overlay for content stored within the protected GPU memory, which provides an overlay for displaying decrypted audiovisual content on a screen within the VR viewing experience with restricted viewing, access, and/or modification of the decrypted audiovisual content.

Additional VR device(s) 110 are one or more devices which function in similar or identical capacity to VR device 108 in sending information to the application server 104, receiving information from the application server 104, or both. In some embodiments, additional VR device(s) 110 are computing devices capable or providing or facilitating a VR experience as described above. In some embodiments, VR device 108 functions with additional VR device(s) 110 in providing or facilitating a single concurrent shared VR viewing experience with multiple participants (i.e., users) being persistent, viewable, and communicable with one another within the shared VR viewing experience as playback of audiovisual content is provided on each of the users' VR devices.

Application database(s) 112 function to store and/or maintain content metadata, user identity data, license data pertaining to users and/or audiovisual content, and/or any other suitable information for the application server 104 to perform elements of the methods and systems herein. In some embodiments, the application database(s) 112 can be queried by one or more components of system 100 (e.g., by the application server 104), and specific stored data in the application database(s) 112 can be retrieved.

Content delivery network database(s) 114 function to store and/or maintain audiovisual content, including open and/or encrypted audiovisual content, playback manifests and data pertaining to playback manifests, content metadata, license information, and/or any other suitable information for the CDN 106 to perform elements of the methods and systems herein. In some embodiments, the CDN database(s) 114 can be queried by one or more components of system 100 (e.g., by the CDN 106), and specific stored data in the CDN database(s) 114 can be retrieved.

Figure 1B:
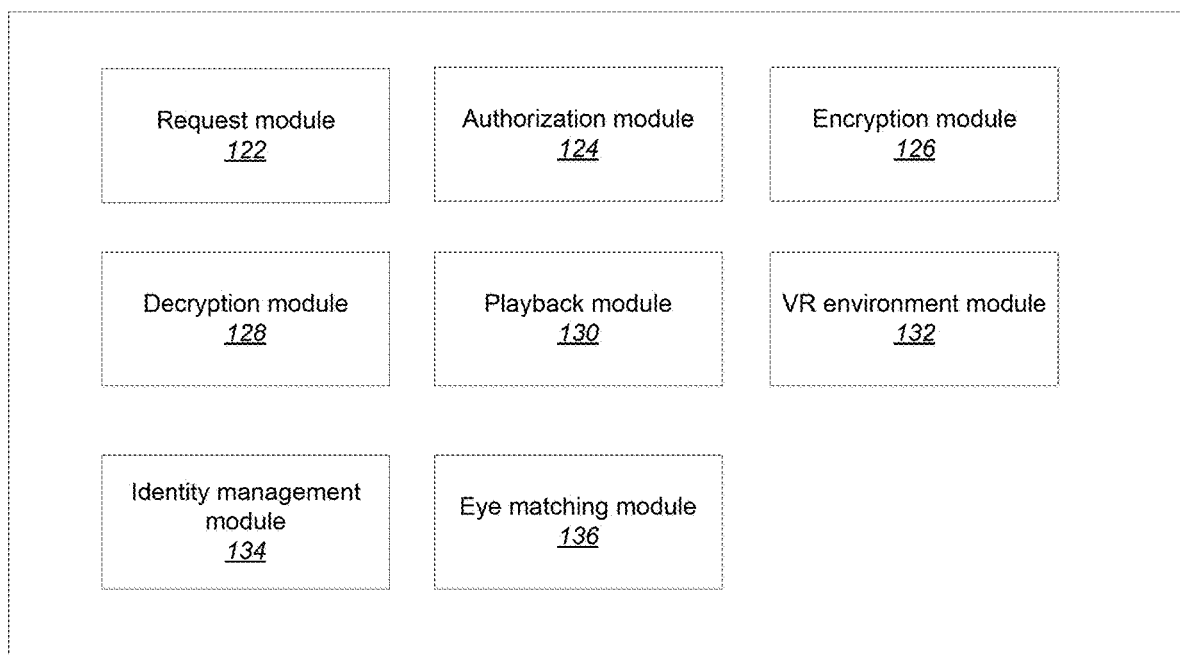
FIG. 1B is a diagram illustrating an exemplary computer system that may execute instructions to perform some of the methods herein.

FIG. 1B illustrates an exemplary computer system 120 with software modules that may execute some of the functionality described herein.

Request module 122 functions to send a request for audiovisual content from the computer system, e.g., from an application or application server, to a content delivery network. In some embodiments, request module 122 may additionally send license acquisition requests to the content delivery network or other requests relating to audiovisual content.

Authorization module 124 functions to authorize a user to access certain audiovisual content by determining whether the user is associated with a valid, unexpired ticket for the audiovisual content. In some embodiments, authorization module 124 performs matching of a visual representation of an eye of the user with preexisting eye signatures of users who are associated with valid, unexpired tickets for the audiovisual content.

Encryption module 126 and decryption module 128 function to encrypt and decrypt audiovisual content, respectively. In some embodiments, public-private key encryption is used for the encryption and decryption.

Playback module 130 functions to play back audiovisual content that has been authorized to play for a user accessing a VR device. In some embodiments, the playback module provides the audiovisual content for display on a screen within the VR viewing experience, such that the audiovisual content plays in a protected, digital rights managed fashion within the screen.

VR environment module 132 functions to facilitate and provide a virtual reality viewing experience for a user accessing a VR device. In some embodiments, the VR viewing experience is a shared viewing experience with one or more additional users accessing VR devices.

Identity management module 134 functions to manage the identity of a user accessing a VR device and provide information about the user regarding the audiovisual content.

Eye matching module 136 functions to capture virtual representations of an eye of the user accessing the VR device, and then match the virtual representations with existing digital signatures of eyes associated with users who have valid, unexpired tickets for the audiovisual content.

The above modules and their functions will be described in further detail in relation to an exemplary method below.

II. Exemplary Method

Figure 2A:
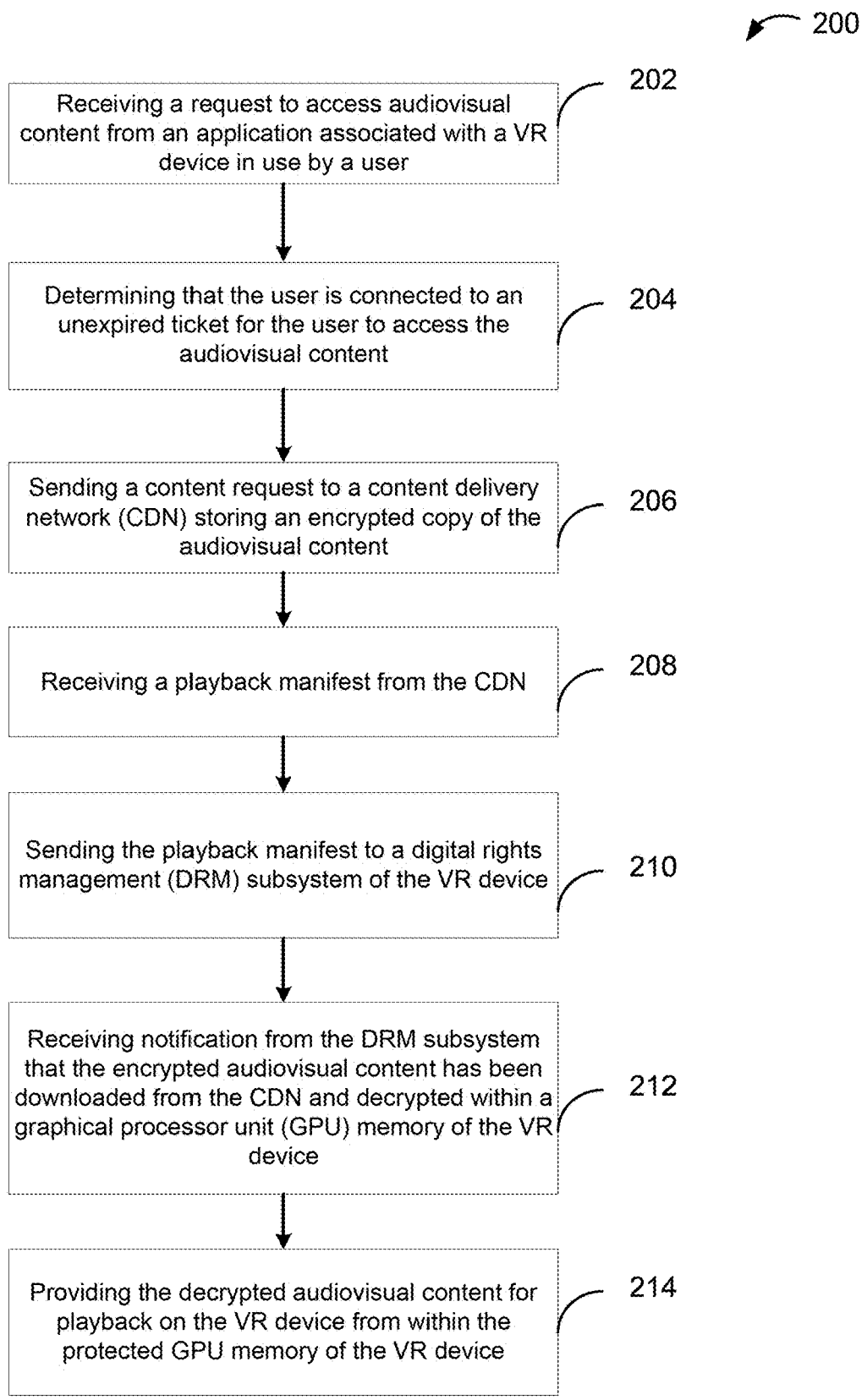
FIG. 2A is a flow chart illustrating an exemplary method that may be performed in some embodiments.

FIG. 2A is a flow chart illustrating an exemplary method that may be performed in some embodiments.

At step 202, the system receives a request to access audiovisual content from an application associated with a VR device in use by a user. In some embodiments, the user accessing the VR device is associated with a valid user session. In some embodiments, a valid user session is a user session in which the user is authorized and identified as a valid user, and in which the user session is active and unexpired. In some embodiments, one or more tokens or certificates may be associated with the user with respect to the application associated with the VR device, the VR device's operating system, and/or the VR device's firmware and/or hardware. In some embodiments, the application associated with the VR device is hosted and executable on the VR device, and is running on the VR device during a user session with the user.

At step 204, the system determines that the user is connected to an unexpired ticket for the user to access the audiovisual content. In some embodiments, a "ticket" as used herein refers to a certificate, token, pass, permit, license, permission, or grant to access the audiovisual content. A ticket may be, for example, a digital token issued on behalf of a user when that user purchases the ticket in a marketplace tied to the application. In some embodiments, a ticket may expire upon a certain amount of time passing. Upon expiration, the ticket is no longer valid and will fail the determination that the user is connected to an unexpired ticket. In some embodiments, the ticket may expire within a predefined period of time upon purchase of the ticket, e.g., within two weeks or purchase, or upon the conclusion of a specified "screening" of the audiovisual content at a certain date and time, or window of time in which the audiovisual content plays.

In some embodiments, the audiovisual content is "public" in the sense that anyone in the general public may purchase a ticket and attend a screening within the VR viewing environment. In other embodiments, the audiovisual content is screened in a private or semi-private screening within the VR viewing environment. In some embodiments, a user may opt to book a virtual screening of the audiovisual content in which the user, and optionally one or more additional users approved or selected by the user, all using VR devices, may screen the audiovisual content without the screening being open to everyone in the public. In some embodiments, a screening is set to play the audiovisual content at specific showtimes, similar to a screening of a movie at a movie theater. In order to view the audiovisual content, the user must attend one of the virtual screenings at the specified showtimes. In alternate embodiments, the audiovisual content may be played back "on demand", i.e., at any time the user selects the content to be played.

In some embodiments, the determination that the user is connected to an unexpired ticket includes receiving, from the application associated with the VR device, a visual representation of an eye of the user accessing the VR device. The determination further includes matching the visual representation of the eye with a preexisting unique eye signature associated with one of the valid, unexpired tickets from the set of tickets. In some embodiments, the visual representation of the eye of the user is generated and/or captured in real time by the VR device as part of the VR's device's built-in eye tracking features. For example, the VR device may be configured to perform eye tracking of users, and via an application programming interface (API) allows the eye capturing elements of the eye tracking to be used by the system to match the visual representation with one of more preexisting eye signatures associated with a user who has purchased a ticket that is still valid for the audiovisual content. The preexisting eye signature may be captured upon the user purchasing the ticket, upon the user creating an account or user profile for the application or VR device, or some other suitable time. In some embodiments, the eye signature may be a photo, series of photos, video, or some other medium for capturing eye data. In some embodiments, the capturing of the visual representation of the eye may be performed in whole or in part by the application on the VR device, the operating system of the VR device, the firmware of the VR device, or some combination thereof.

In some embodiments, the system performs the steps of receiving a visual representation of the eye of the user and matching the representation with one or more eye signatures on a periodic basis, continuously, until some condition is satisfied. In some embodiments, the receiving and matching are performed during playback of the audiovisual content, if applicable, until playback stops (e.g., the content ends, the user stops the content, or any other suitable form of stopping playback).

At step 206, the system sends a content request to a content delivery network (CDN) storing an encrypted copy of the audiovisual content. In some embodiments, the CDN is a third-party provider server or network which hosts audiovisual content. In some embodiments, the CDN hosts unsecured, unprotected audiovisual content (e.g., a movie file without encryption or DRM associated with the file). In some embodiments, upon the system sending the content request to the CDN, the CDN packages the audiovisual content with DRM-related tokens or certificates, one or more appropriate licenses associated with the audiovisual content, and/or the appropriate content metadata associated with the audiovisual content. In various embodiments, the content metadata can include, e.g., information about the user and the user's identity, the requested audiovisual file, the owner or creator of the audiovisual content, a description of the audiovisual content or various elements of the file (e.g. file size, date created, date accessed), ticket information, purchase information if applicable (including whether the user purchased the audiovisual content), and/or any other suitable information regarding the audiovisual content.

At step 208, the system receives a playback manifest from the CDN. In some embodiments, the CDN generates the playback manifest based on the audiovisual content and its packaged data and files. The playback manifest is a document which includes a list of audiovisual content to be played back in a certain order, along with appropriate licenses for the audiovisual content which are required for the authorized playback by a user with a valid ticket. In some embodiments, the playback manifest provides instructions for how to give access to the audiovisual content, with the instructions intended to be read by the VR device for decrypting and playing back the content. The playback manifest does not contain the audiovisual content itself, but rather data and/or instruction for how to access the video, including location data such as one or more uniform resource locators (URLs). In addition, audiovisual content is not hosted on the VR device or application server, but only on the CDN.

At step 210, the system sends the playback manifest to a DRM subsystem of the VR device. In some embodiments, the DRM subsystem is a set of hardware components on the VR device configured for digital rights management of audiovisual content being processed and played back by the VR device. In some embodiments, the DRM subsystem includes a trusted protection module for providing audiovisual content in a trusted, protected fashion within the VR device. In some embodiments, the DRM subsystem and/or trusted protection module are industry standard hardware components for DRM. In some embodiments, the DRM subsystem is configured to operate according to one or more DRM protocols. The DRM protocol(s) are configured for processing the playback manifest and using the received data from the manifest to locate the audiovisual content for download on the VR device. In some embodiments, the DRM protocols may be such industry standard protocols as Widevine or PlayReady.

At step 212, the system receives notification from the DRM subsystem that the audiovisual content has been downloaded from the CDN and temporarily stored within a graphical processor unit (GPU) memory of the VR device. In some embodiments, upon the DRM subsystem receiving the playback manifest, the DRM subsystem sends the playback manifest to the application on the VR device, which directly connects to the internet and attempts to download the audiovisual content from its location within the CDN as described in the playback manifest. In some embodiments, the audiovisual content is temporarily stored within the GPU memory of the VR device. In some embodiments, the GPU memory is protected memory which is inaccessible and not modifiable by the application or third party applications.

At step 214, the system provides the audiovisual content for playback on the VR device from within the protected GPU memory of the VR device. In some embodiments, the playback occurs on a flat area screen within a VR viewing experience facilitated on the VR device by the application. In some embodiments, the flat area screen is a trusted, protected overlay which is configured to play back audiovisual content located within the protected GPU memory. The user can see and/or hear the audiovisual content during the VR viewing experience facilitated by the application, but the application itself does not have access to the audiovisual content or its packaged contents.

In some embodiments, the audiovisual content is played within a shared VR viewing experience facilitated by the application on the user's VR device in addition to corresponding instances of the application running on one or more additional VR devices in use by one or more additional users. In some embodiments of the shared VR viewing experience, the additional users appear with predefined avatars representing the users which are viewable within the VR environment by the user. In some embodiments, the audiovisual content can be screened within the shared VR environment, such that all users within the virtual room see the same audiovisual content, at the same time, in the same moment within the audiovisual content. In this way, for example, all users in a VR room, such as a virtual theater, can watch the same movie, and every scene and frame of the movie is shown concurrently to each user at the same time. In some embodiments, the physical location of the user is irrelevant to this concurrent playback, such that it does not matter where in the world a user is in order for that user to see the same content in real time as others in the room.

For example, audiovisual content in the form of a film can be presented to users wearing VR headsets and engaged in an immersive virtual reality experience. The film is presented on a large flat movie screen inside of a virtual theater. Whatever screen a given user sees, the other users wearing respective headsets can also join the room and see the same screen. In some situations, users can invite other users into the room or allow public users to join the room. Users appear as avatars which may be selected, designed, and/or customized by users. This allows for co-watching and shared viewing of the screen and film with others in the same virtual room. Typical use cases may involve, e.g., watching a movie together, playing a video game together, or business applications such as co-working, collaboration, screen sharing, and presentation experiences within the VR environment. In some embodiments, people within the same VR room can communicate with each other, such as through, e.g., voice chat, gestures, or interacting with objects within the environment. In some embodiments, mechanisms are put into place to control or minimize the extent to which users can be disruptive or antagonistic toward other users.

Figure 2B:
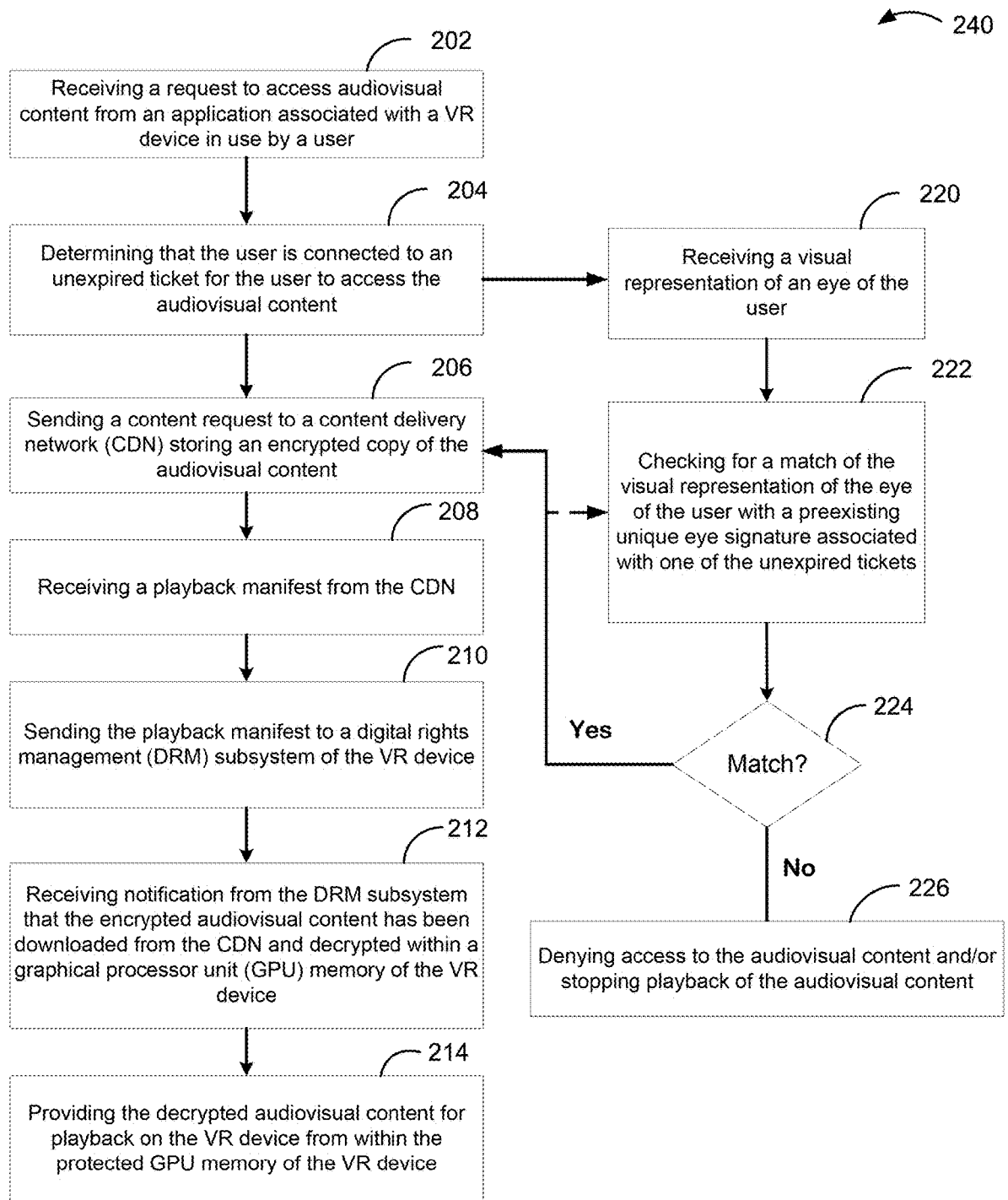
FIG. 2B is a flow chart illustrating additional steps that may be performed in accordance with some embodiments.

FIG. 2B is a flow chart illustrating additional steps that may be performed in accordance with some embodiments. The method 220 includes the steps of method 200 and additionally includes steps 220, 222, 224, and 226. Namely, in some embodiments, the system can receive a visual representation of an eye of the user at step 220, and then check for a match of the visual representation of the eye of the user with a preexisting unique eye signature associated with one of the unexpired tickets at step 222. At step 224, if a match is not found, then the system denies access to the audiovisual content and/or stops playback of the audiovisual content for the user at step 226. If a match is found, then the system proceeds to step 206, where the system can send a content request to a content delivery network to retrieve the audiovisual content for playback. In some embodiments, rather than sending a content request, if an audiovisual file is already being played back on the VR device, then the system can continuously and/or periodically return to step 222 to check for a match at regular intervals.

III. Exemplary User Interfaces

Figure 3A:
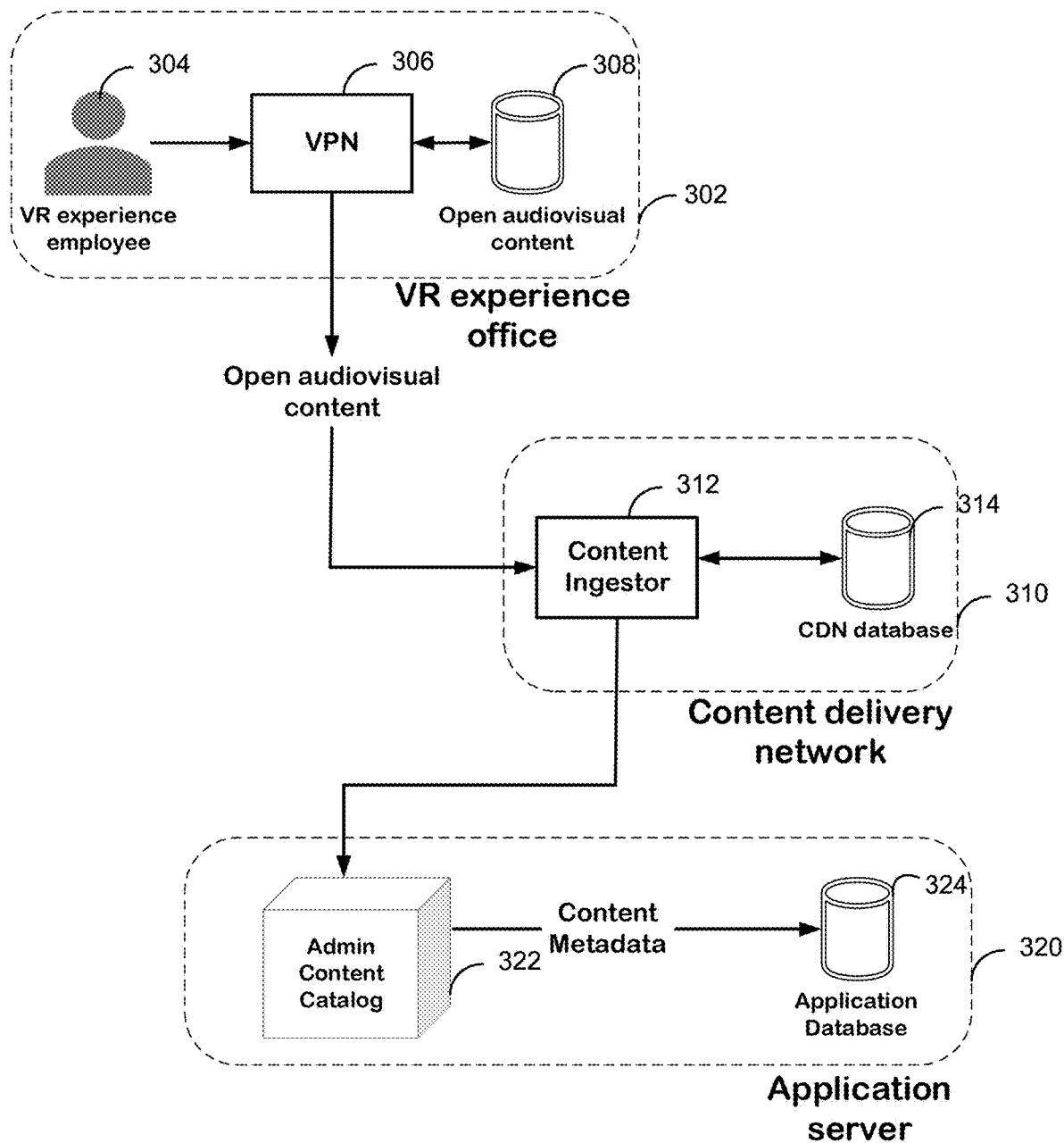
FIG. 3A is a diagram illustrating one example of a process for ingesting, processing, and storing audiovisual content in accordance with some of the systems and methods herein.

FIG. 3A is a diagram illustrating one example of a process for ingesting, processing, and storing audiovisual content in accordance with some of the methods herein.

First, at a VR experience company's office 302, where the VR experience company develops and maintains its application which facilitates a VR viewing experience for users of VR devices, a VR experience employee 304 works with a content owner, such as a movie studio, to receive audiovisual content as an unprotected audiovisual file via a file server, and send it to a database of open audiovisual content 308 via the VR experience company's virtual private network (VPN) 306.

Next, the VR experience employee sends the open audiovisual content over the VPN 306 to a content delivery network 310, such as Brightcove, to be ingested by the CDN's content ingestor 312. The content ingestor then sends the audiovisual content to a CDN database of audiovisual content 314, where the audiovisual content gets hosted and packaged with DRM, licenses, and/or content metadata.

The content ingestor 312 then sends the audiovisual content to an admin content catalog 322 or some other receiving component of an application server 320, which is a server used by the VR company's application. The admin content catalog 322 sends the content metadata, including license information, to an application database 324 so that the content metadata can be stored on the application server 320. The application server 320 does not store the audiovisual content itself. It merely stores the content metadata so that the application can store and retrieve information about the nature of the content, where it is stored, the name of the content, and any other suitable metadata that is useful for the application during its operation.

Figure 3B:
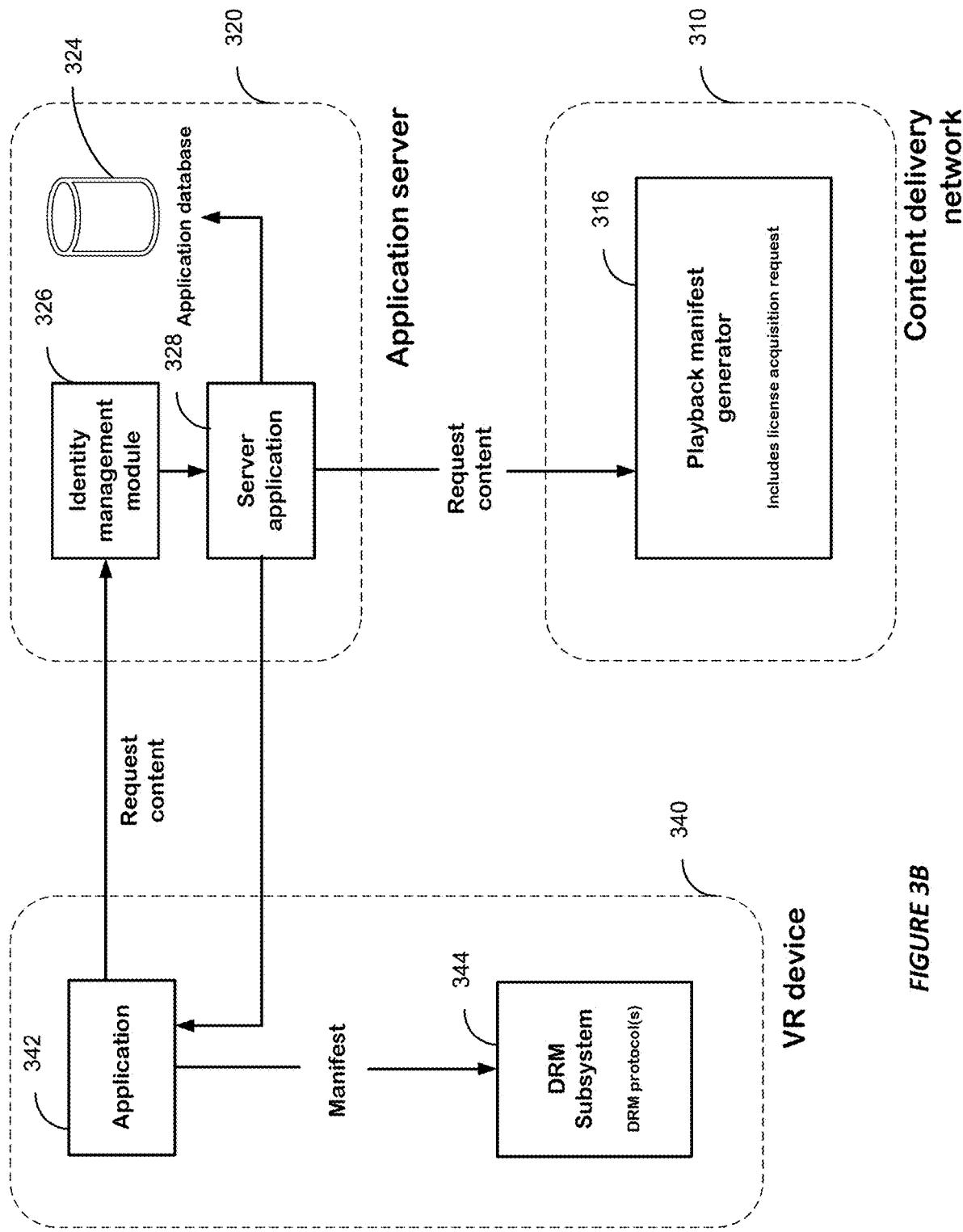
FIG. 3B is a diagram illustrating one example of a process for requesting audiovisual content and generating a playback manifest in accordance with some of the systems and methods herein.

FIG. 3B is a diagram illustrating one example of a process for requesting audiovisual content and generating a playback manifest in accordance with some of the systems and methods herein.

First, a user of a VR device 340 begins using the VR device, thereby creating a valid user session, and launches an application 342 facilitating a VR viewing experience on the VR device 340. As the user navigates through the app, user can select some audiovisual content the user wishes to access. If a purchase is required, the user can navigate through the purchase process until completion of the sale, in which case a ticket for accessing the audiovisual content is generated for the user. The application then requests the content by sending a request for the content to the application server 320. The request is received by an identity management module 326 at the application server 320. The request can include, for example, a request for whether the content is available and retrievable. The identity management module 326 processes the request and determines whether a valid, unexpired ticket can be found for the user to access the audiovisual content. If the ticket can be found, the request is sent on to the server application 328, which processes the request and sends it on to the content delivery network 310.

The content delivery network 310 generates a playback manifest at a playback manifest generator 316 in response, as a list of which audiovisual content is to be played in which order, and which licenses apply to each. The generation of the playback manifest includes a license acquisition request if applicable, i.e., if no license can be found for the audiovisual content, or a license is found but the VR experience company has not acquired the license, then the content delivery network 310 can send a request for a license to be acquired to the application server, VR experience office, and/or a third party application or server handling license requests.

Once generated, the playback manifest is sent from the content delivery network 310 to the application server 320, then back to the VR device 340 at application 342. The application 342 then sends the playback manifest to the DRM subsystem 344 on the VR device, which is configured to execute one or more DRM protocols. In some cases, the playback manifest includes content metadata regarding which DRM protocol to use to process the audiovisual content for playback.

Figure 3C:
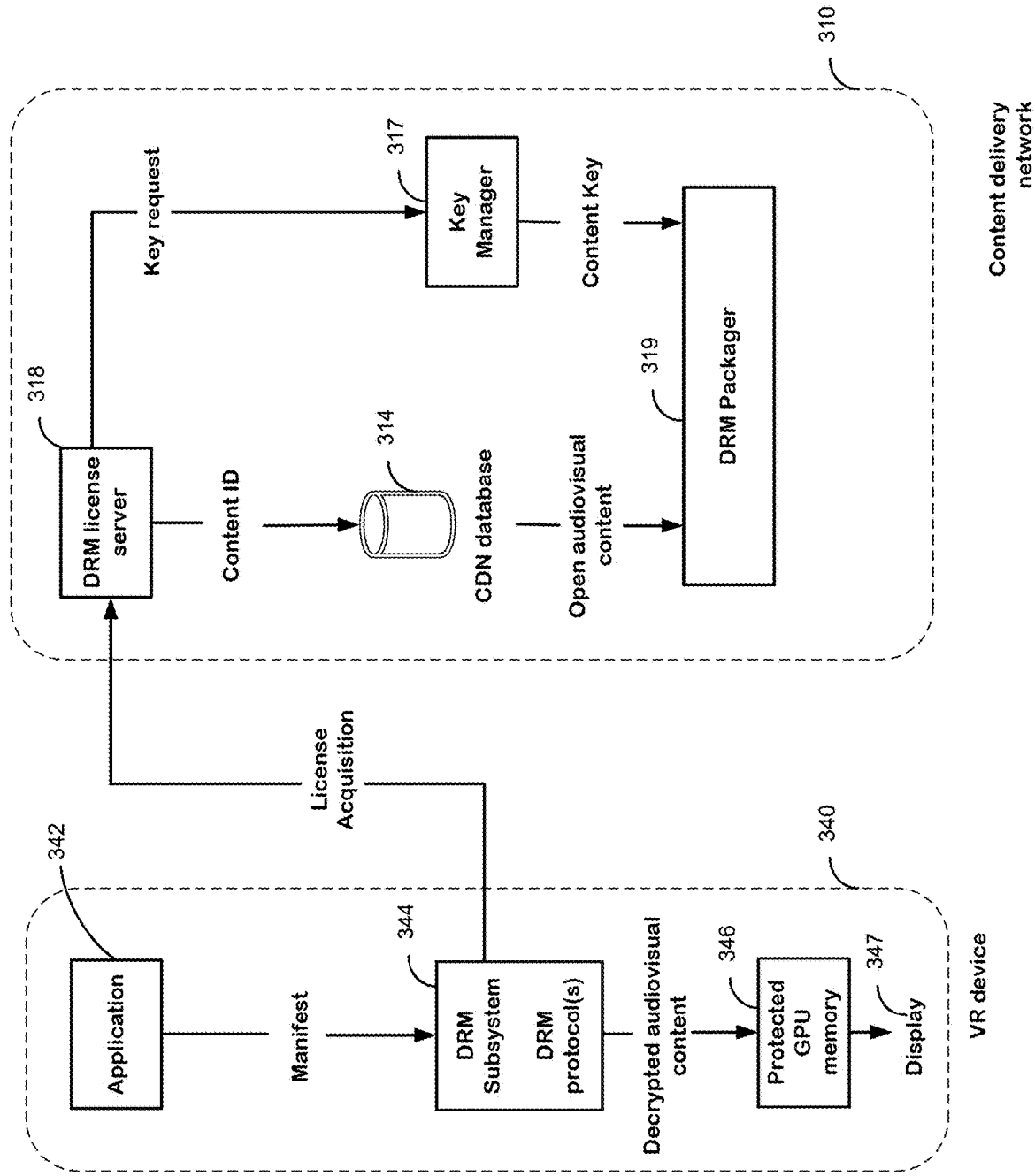
FIG. 3C is a diagram illustrating one example of a process for playback of audiovisual content on a VR device in accordance with some of the systems and methods herein.

FIG. 3C is a diagram illustrating one example of a process for playback of audiovisual content on a VR device in accordance with some of the systems and methods herein.

On the VR device 340, the DRM subsystem 344 sends a license acquisition request to a DRM license server 318 within the content delivery network 310. This license acquisition request is based on the playback manifest data received by the DRM subsystem 344. The DRM license server 318 looks up the content identification number (content ID), which is the ID corresponding to the actual audiovisual content being requested for playback. The content ID is retrieved from the CDN database 314 and the open audiovisual content is retrieved and sent to the DRM packager 319. The DRM packager 319 receives content metadata for the content and ensures that only access to protected content on the CDN is given, not access to open content. The metadata provides information to the DRM packager regarding which DRM protocol to use to protect the content.

Along with the license acquisition request, the DRM subsystem also sends a key request to a key manager 314 of the CDN. The key manager receives the request, which serves to uniquely authentic that specific VR device and piece of hardware. The key manager provides public and private key encryption of the audiovisual content by creating public keys assigned to the DRM subsystem to encrypt the audiovisual content, and then sends the appropriate keys to the DRM subsystem, which has the ability to download audiovisual content from the CDN. Since the public keys of the DRM subsystem are used to encrypt the content, the content will be later able to be decrypted by the same VR device using private keys which uniquely authenticate that device.

Either the application 342 or the DRM subsystem 344 proceed to directly connect to the internet and download bytes of the data from the CDN constituting the encrypted, protected content. The DRM subsystem 344, having sent the correct keys to the content delivery network, also has the equivalent keys to decrypt that content.

The DRM subsystem 344 decrypts the audiovisual content and stores it temporarily within protected GPU memory, which is not accessible to third parties nor the application 342. After decryption of the content, it now exists as open data, but remains within protected GPU memory 346, such that it cannot be easily copied, saved, or broadcasted. Thus, the content cannot be pirated easily. The content is then played back for the VR display 344. The decrypted content, which is now in protected GPU memory, is not directly accessible by the application 342 or any third party applications, but must be viewable by the user of the VR device. The content is distorted correctly to fit within the virtual world where the virtual screen is supposed to be, and the application 342 renders the virtual environment, including, e.g., seats, carpet, avatars of users, voices of users, lights, and any other suitable aspects of the virtual environment. The application 342 provides the instructions for how, when, where, and which content is to be displayed on the screen, even though the application itself has no access to the screen and neither the application nor any third party can read pixels from the protected GPU memory. To the application, the screen appears as a black screen. The content gets delivered straight into the VR device, and gets displayed exactly where it is intended to be displayed for a user who is using the VR device.

Figure 4:
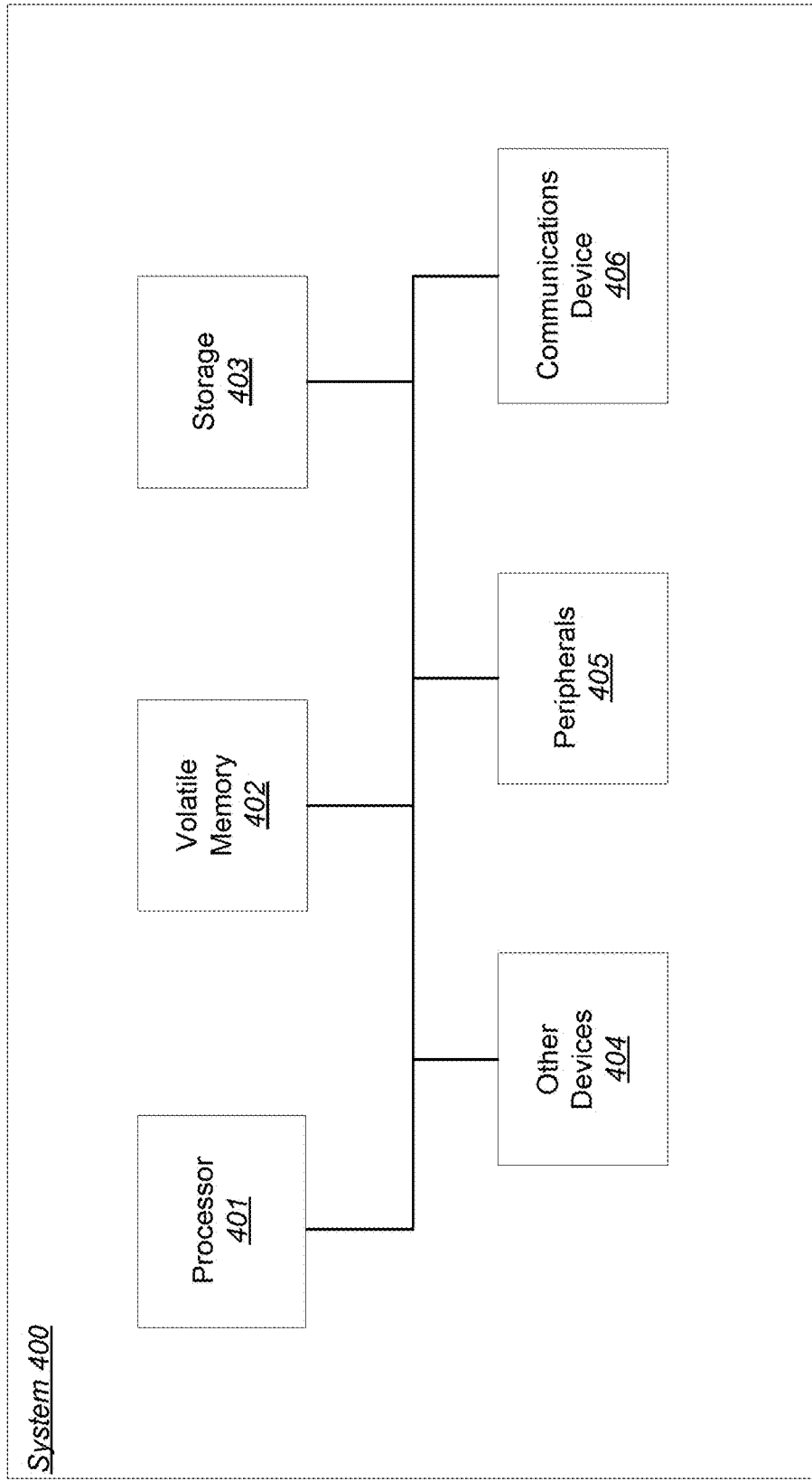
FIG. 4 is a diagram illustrating an exemplary computer that may perform processing in some embodiments.

FIG. 4 illustrates one environment in which some embodiments may operate. Exemplary computer 400 may perform operations consistent with some embodiments. The architecture of computer 400 is exemplary. Computers can be implemented in a variety of other ways. A wide variety of computers can be used in accordance with the embodiments herein.

Processor 401 may perform computing functions such as running computer programs. The volatile memory 402 may provide temporary storage of data for the processor 401. RAM is one kind of volatile memory. Volatile memory typically requires power to maintain its stored information. Storage 403 provides computer storage for data, instructions, and/or arbitrary information. Non-volatile memory, which can preserve data even when not powered and including disks and flash memory, is an example of storage. Storage 403 may be organized as a file system, database, or in other ways. Data, instructions, and information may be loaded from storage 403 into volatile memory 402 for processing by the processor 401.

The computer 400 may include peripherals 405. Peripherals 405 may include input peripherals such as a keyboard, mouse, trackball, video camera, microphone, and other input devices. Peripherals 405 may also include output devices such as a display. Peripherals 405 may include removable media devices such as CD-R and DVD-R recorders/players. Communications device 406 may connect the computer 100 to an external medium. For example, communications device 406 may take the form of a network adapter that provides communications to a network. A computer 400 may also include a variety of other devices 404. The various components of the computer 400 may be connected by a connection medium 410 such as a bus, crossbar, or network.

While the invention has been particularly shown and described with reference to specific embodiments thereof, it should be understood that changes in the form and details of the disclosed embodiments may be made without departing from the scope of the invention. Although various advantages, aspects, and objects of the present invention have been discussed herein with reference to various embodiments, it will be understood that the scope of the invention should not be limited by reference to such advantages, aspects, and objects. Rather, the scope of the invention should be determined with reference to patent claims.

What is claimed:

1. A method for providing audiovisual content in a virtual reality (VR) viewing experience, comprising:

receiving, from an application associated with a VR device, a request to access audiovisual content, wherein the VR device is in use by a user during a valid user session in response to the request, determining that the user is connected to an unexpired ticket for the user to access the audiovisual content;

sending a content request to a content delivery network (CDN) storing an encrypted copy of the audiovisual content;

receiving, from the CON, a playback manifest for the audiovisual content comprising at least license information for the audiovisual content;

sending the playback manifest to a digital rights management (DRM) subsystem of the VR device, wherein the DAM subsystem is configured to execute a DRM protocol capable of processing the playback manifest;

receiving notification from the DRM subsystem that the encrypted audiovisual content has been downloaded from the CON and decrypted within a protected graphical processor unit (GPU) memory of the VR device; and providing the decrypted audiovisual content for playback on the VR device from within the protected GPU memory of the VR device;

wherein the determining that the user is connected to an unexpired ticket comprises at least:

receiving, from the application associated with the VR device, a visual representation of an eye of the user accessing the VR device, and matching the visual representation of the eye of the user with a preexisting unique eye signature associated with one of the valid, unexpired tickets from the set of tickets.

2. The method of claim 1, wherein the VR device is configured to perform eye tracking of users, and wherein the eye tracking comprises capturing the visual representation of the eye of the user accessing the VR device.

3. The method of claim 1, wherein the receiving and matching are continuously performed on a periodic basis during playback of the audiovisual content, and wherein playback of the audiovisual content stops if a match cannot be made.

4. The method of claim 1, wherein the VR device is a wearable device, and wherein the valid user session comprises the user exclusively wearing the VR device during operation.

5. The method of claim 1, wherein the playback of the decrypted audiovisual content on the VR device is configured to be accessible only to the user accessing the VR device during the valid user session or a subsequent valid user session.

6. The method of claim 1, wherein the playback of the decrypted audiovisual content on the VR device is configured to be displayed on a virtual screen within the application associated with the VR device, and wherein the audiovisual content is inaccessible by the application and third-party applications.

7. The method of claim 1, wherein the VR viewing experience is a shared viewing experience accessible concurrently with one or more additional users associated with valid, unexpired tickets, and wherein the decrypted audiovisual content can be played back concurrently by the one or more additional users.

8. The method of claim 1, wherein the ticket associated with the user is configured to expire within a predefined period of time from the moment the audiovisual content begins playing back on the VR device during a valid user session with the user.

9. The method of claim 1, wherein the audiovisual content is configured to be encrypted and decrypted using a public-private key encryption technique.

10. A non-transitory computer-readable medium containing instructions for providing a VR viewing experience, the instructions for execution by a computer system, the non-transitory computer-readable medium comprising:

instructions for receiving, from an application associated with a VR device, a request to access audiovisual content, wherein the VR device is in use by a user during a valid user session instructions for determining, in response to the request, that the user is connected to an unexpired ticket for the user to access the audiovisual content;

instructions for sending a content request to a content delivery network (CDN) storing an encrypted copy of the audiovisual content;

instructions for receiving, from the CDN, a playback manifest for the audiovisual content comprising at least license information for the audiovisual content;

instructions for sending the playback manifest to a digital rights management (DRM) subsystem of the VA device, wherein the DRM subsystem is configured to execute a DRM protocol capable of processing the playback manifest;

instructions for receiving notification from the DRM subsystem that the encrypted audiovisual content has been downloaded from the CDN and decrypted within a protected graphical processor unit (GPU) memory of the VA device; and instructions for providing the decrypted audiovisual content for playback on the VA device from within the protected GPU memory of the VA device;

wherein the determining that the user is connected to an unexpired ticket comprises at least:

receiving, from the application associated with the VR device, a visual representation of an eye of the user accessing the VR device, and matching the visual representation of the eye of the user with a preexisting unique eye signature associated with one of the valid, unexpired tickets from the set of tickets.

11. The non-transitory computer-readable medium of claim 1, wherein the VR device is configured to perform eye tracking of users, and wherein the eye tracking comprises capturing the visual representation of the eye of the user accessing the VR device.

12. The non-transitory computer-readable medium of claim 1, wherein the receiving and matching are continuously performed on a periodic basis during playback of the audiovisual content, and wherein playback of the audiovisual content stops if a match cannot be made.

13. The non-transitory computer-readable medium of claim 10, wherein the VR device is a wearable device, and wherein the valid user session comprises the user exclusively wearing the VR device during operation.

14. The non-transitory computer-readable medium of claim 10, wherein the playback of the decrypted audiovisual content on the VR device is configured to be accessible only to the user accessing the VR device during the valid user session or a subsequent valid user session.

15. The non-transitory computer-readable medium of claim 10, wherein the playback of the decrypted audiovisual content on the VR device is configured to be displayed on a virtual screen within the application associated with the VR device, and wherein the audiovisual content is inaccessible by the application and third-party applications.

16. The non-transitory computer-readable medium of claim 10, wherein the VR viewing experience is a shared viewing experience accessible concurrently with one or more additional users associated with valid, unexpired tickets, and wherein the decrypted audiovisual content can be played back concurrently by the one or more additional users.

17. The non-transitory computer-readable medium of claim 10, wherein the ticket associated with the user is configured to expire within a predefined period of time from the moment the audiovisual content begins playing back on the VR device during a valid user session with the user.

18. The non-transitory computer-readable medium of claim 10, wherein the audiovisual content is configured to be encrypted and decrypted using a public-private key encryption technique.

* * * * *